Sept. 28, 1943.    J. V. PARKER    2,330,615
TUFTING MACHINE
Filed Sept. 28, 1939    2 Sheets-Sheet 1
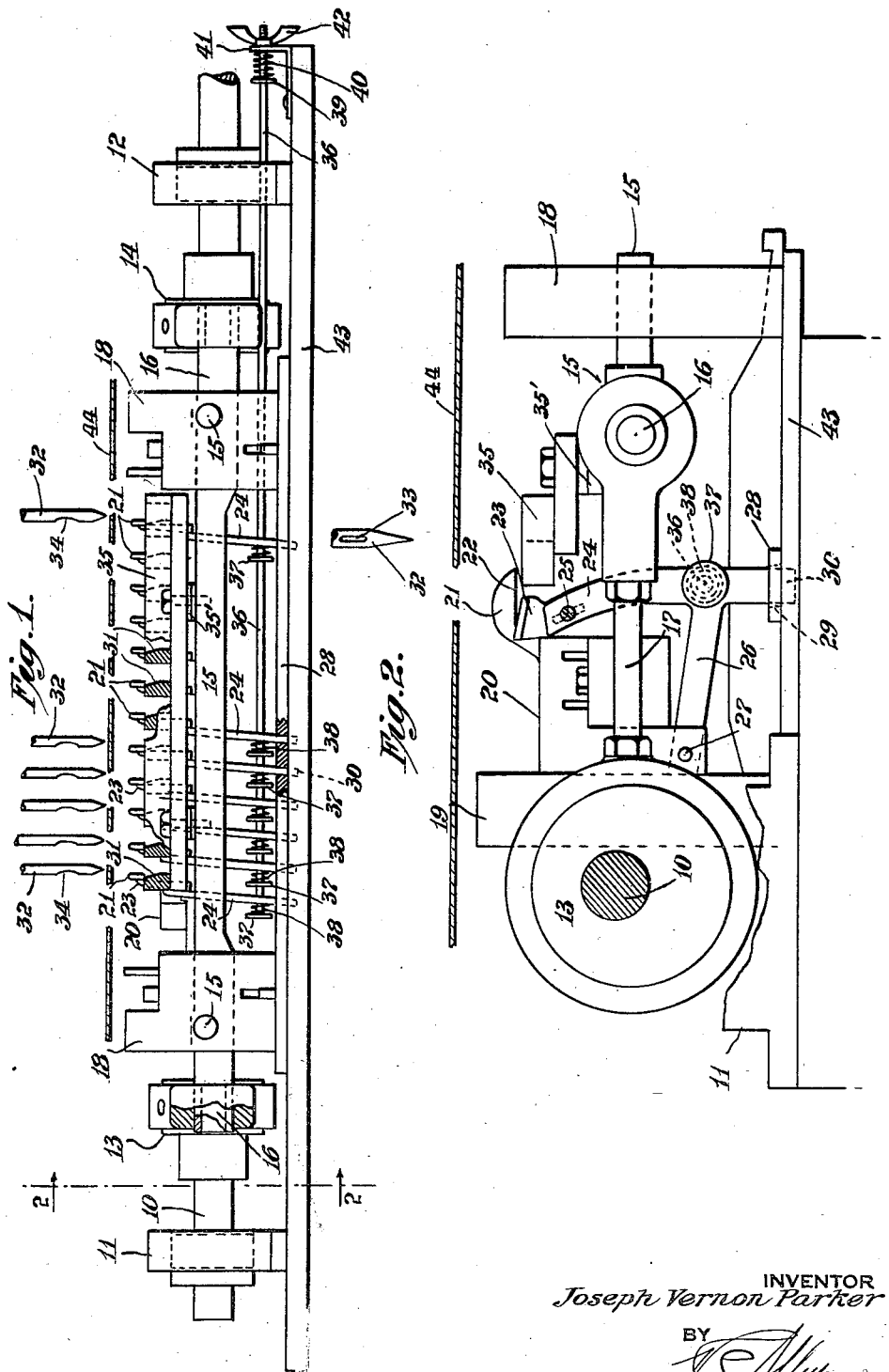
INVENTOR
Joseph Vernon Parker
BY
ATTORNEY Sept. 28, 1943. J. V. PARKER 2,330,615
TUFTING MACHINE
Filed Sept. 28, 1939 2 Sheets-Sheet 2
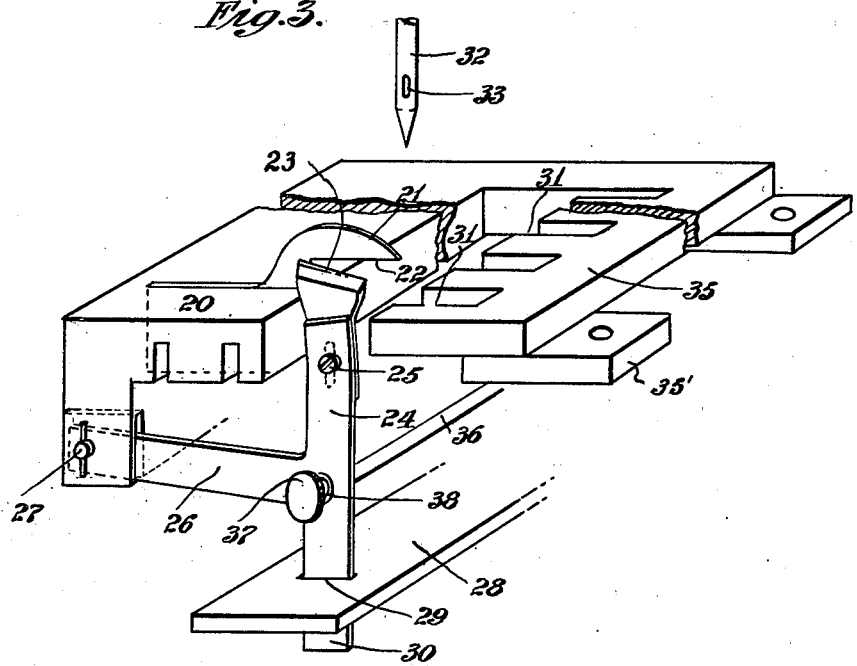
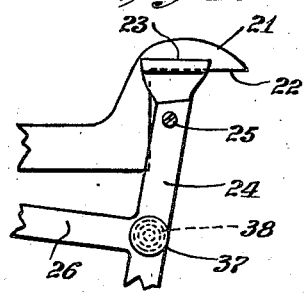
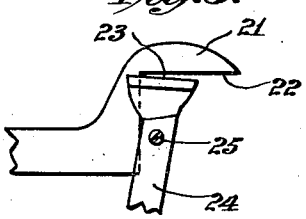
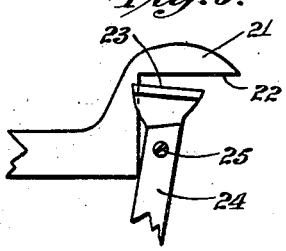
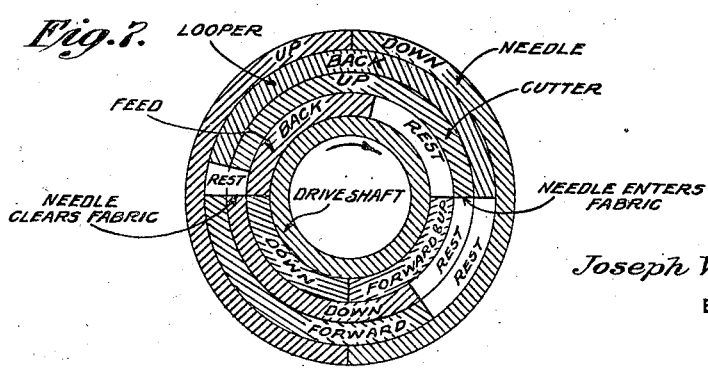
INVENTOR
Joseph Vernon Parker
BY
ATTORNEY Patented Sept. 28, 1943

2,330,615

UNITED STATES PATENT OFFICE 2,330,615

TUFTING MACHINE

Joseph Vernon Parker, La Grange, Ga., assignor to Callaway Mills, La Grange, Ga., a corporation of Georgia Application September 28, 1939, Serial No. 296,954

6 Claims. (Cl. 112—79)

This invention relates to tufting machines and has for an object to provide a machine capable of forming uniform tufts.

Another object is to provide a multi-needle machine of this class in which needle vibrations have been reduced thus contributing to uniformity in the work and enabling heavier work to be operated upon.

Yet a further object has been to provide a tufting machine in which the cutting of the tufts is by means of shearing blades pivoted adjacent the loopers and in which the pressure between the shearing blades and loopers may be easily and quickly controlled, either individually when the machine is stopped or collectively.

Suggestions have been made for multi-needle tufting machines to be provided with loopers each having a shearing blade cooperating therewith to cut a loop on the looper, the shearing blade being pivoted to the looper and cooperating with a stationary member so as to be movable in response to looper movement without the provision of other cutter actuating mechanism than that for moving the loopers. One objection to the foregoing suggestion has been that the tufts may not be as uniform in length at all times as may be desired. It has been discovered that one possible cause of this difficulty has been in the looper movement, the effective portion of the looper changing either or both its inclination and elevation with respect to the work, whereby the loops are sometimes tight and at other times loose and the cutting taking place when the loops are loose or stretched results in the cut not always taking place precisely where desired or in the same part of the loop.

One feature contributing to better results in this machine is the provision of a looper, the movements of which are at all times substantially parallel to the work whereby the tufts are more nearly uniformly tensioned. While making no claim to this feature broadly, it is thought new in the type of machine in which the tufts are cut by a shearing action and in which no separate actuating mechanism is necessary for each shearing blade, but in which the looper serves as one shear blade and in which the shearing blade also cooperates with the stationary support and functions in response to the looper movement.

Another feature of this invention is the provision of a multi-needle tufting machine in which the various elements thereof have been adapted for use with suitable needle guides to reduce vibration and effect precision operation even with heavy goods. Such a needle guide has not, so far as is known, been embodied or adapted for embodiment in a multi-needle machine of the type previously referred to.

A further feature of the present machine resides in the ability to adjust the pressure between each pair of shearing elements, either individually, or collectively to increase the certainty of cutting taking place.

Referring to the drawings

Fig. 1 is a right side view of the device shown in Fig. 2.

Fig. 2 is a section on the line 2—2 of Fig. 1.

Fig. 3 is a perspective showing the manner of attachment of the shearing blade to the looper.

Fig. 4 shows the position of the looper and shearing blade when the needle is half way down.

Fig. 5 shows their position when the needle is in its lowermost position.

Fig. 6 shows the position of these parts when the needle is half way up.

Fig. 7 is a timing chart.

Referring to Figs. 1 and 2, a rotary drive shaft 10 is mounted in bearings 11 and 12 and provided adjacent each bearing with an eccentric or cam 13 and 14. The horizontally mounted slide 15 is pivotally connected at 16 with the connecting rod 17 joining the eccentric 13, the slide 15 being mounted in bearing supports 18 and 19. Secured to the slide 15 is a looper support 20 carrying a number of separate loopers 21 each provided with a substantially horizontal lower edge 22 which is parallel with the work while being operated upon. The loopers 21 are preferably not integral but are attached to the looper support 20.

As shown more clearly in Fig. 3, a shearing blade 23 is provided with a support 24 to which the blade 23 is adjustably secured by means of a set screw 25. An arm 26 of the blade support is pivoted at 27 to the looper support and as shown in Fig. 3 the blade support and the looper support are each generally L-shaped. A stationary member 28 is provided with a hole 29 for a projection 30 extending downwardly from each blade support 24. The hole 29 is of a size to allow ample clearance around the projection 30 so that as the blade support and looper support move horizontally backward and forward, the stationary member 28 causes the shearing blade 23 to be moved toward and from the looper for the purpose of shearing any loop carried thereby. As shown in Figs. 2 and 3, an end portion of the blade 23 always overlaps the looper 21 or its support so that the blade may be pressed against the looper or looper support to obtain a satisfactory shearing action.

Disposed below and opposite each looper is an inclined needle guide surface 31 for the purpose of engaging and slightly flexing each needle to insure uniform movements thereof reducing any vibrations in the needle and enabling heavy work to be operated upon. Each needle 32 has its eye 33 arranged in general alinement with the row of needles. The customary recess 34 above the needle eye provides space to facilitate engagement of the looper between the needle and strand. Each needle guide surface 31 is on the side of a prong-like support 35 which is integral with the looper support 20. This support 35 is fastened to the slide 15 by bolts passing through brackets 35' whereby said supports move horizontally with said slide.

Beneath the shearing blades as shown in Figs. 1 and 3 is a rod 36 extending longitudinally of the row of needles, this rod being provided with a number of abutments 37 and a number of coil springs 38 arranged between each abutment 37 and a shearing blade support 24. These springs press the blade against the looper or its support. Each abutment 37 may be adjusted relative to the rod 36, as for example, by means of the abutment being threaded or otherwise secured on the rod. Adjacent one end of the rod 36 is another abutment 39 so that a coil spring 40 may cooperate with the abutment 39 and the supporting angle 41. By adjusting the wing nut 42 on the rod 36 the rod may be moved either to the right in Fig. 1 by the wing nut or to the left by the spring 40 when the nut 42 permits it for the purpose of controlling the pressure of all the shearing blades against their loopers or looper supports and thus affecting the ability of the blades to shear whatever type of strand is being used. In Fig. 2 it will be seen the stationary member 28 is mounted adjacent the bed of the machine 43.

The loopers and blades are preferably made of high speed steel and the connecting rods and eccentrics 17 and 13 respectively may be made of appropriate aluminum alloy for the purpose of reducing inertia of these rapidly moving parts. The needles may or may not assist in feeding the goods through the machine. In the preferred embodiment the needles do not move with the goods.

The needles may or may not be capable of being selectively rendered operative or inoperative and this adjustment of the needles for operation or not, may be accomplished manually or in response to a pattern as is well known in the art.

It is thought that the operation of this machine will be better understood from the timing chart of Fig. 7. The term "back" refers to movement in the direction of the feed of the goods and away from the operator. The feed dog while not shown is located above the goods rather than below. From Fig. 7 it will be seen that as soon as the needle clears the goods the feed dog moves the goods to the rear. Unlike the usual tufting machine, the looper continues to move into the loop as the needle is withdrawn and while it is within the goods. The looper is then retracted with the goods but continues its rearward movement after the feed has ceased. The feed mechanism forces the loop far enough on the looper so that it comes between the shearing blades at the proper time. The shearing blade moves with the looper. By adjusting the set screw 25 and therefore the position of the shearing blade with respect to the looper, the time and place of cutting may be varied. By this adjustment it is possible to have no uncut loop always on the looper or, if desired, one or more uncut loops may be always on the looper. The lower or loop holding edge 22 of the looper is substantially parallel with the work support though it may have a very slight downward inclination.

Either a very small inconspicuous hook or substantially none at all is provided at the tip of the looper. It is the substantially horizontal movement of the lower edge of the looper which is a factor in maintaining the tuft lengths uniform. Preferably though not necessarily the shearing operation takes place before or at about the time the work feed ceases in the cycle of operation so that there will be no tendency for the looper to pull or distort an already formed loop or portion thereof. The looper is able to move through a loop held by it without pulling the loop. The position for the looper and shearing blade shown in Fig. 5 is also the same when the needle is in its uppermost position. It will be seen the forward movement of the looper starts before the needle reaches its lowermost position and continues until the needle is ready to clear the goods.

The adjustment of the wing nut 42 may be unnecessary except when either or both the strand or type of goods has been changed sufficiently to affect the cutting.

The amount of clearance between the hole 29 and the projection 30 is only about a sixty-fourth (1/64) of an inch or enough to permit the desired movement of the shearing blade with respect to the looper.

Among the advantages of this invention may be mentioned the simplicity of applicant's construction whereby the looper with its cutting edge has a substantially straight line horizontal movement parallel to the work support 44 so that the loops carried by the looper are always more uniformly tensioned than would be the case if the looper moved toward or from the work or changed its angular relation to the work support. This movement of the looper is believed to assist in the production of uniform tuft lengths. The particular means for moving the shearing blade toward and from the looper does away with the necessity for any additional blade actuating mechanism other than that for moving the looper since the blade is pivoted to the looper support at 27. The shearing blade 23 should not cooperate with the full length of the looper but terminate back of the point of the looper since the needle guide overlaps the looper.

The horizontal movement of the looper and especially its loop holding edge 22 in a direction substantially parallel with the work support, as well as the movement of the looper far into the loop so that the loop is initially detained well back on the looper and the substantially simultaneous movement of the looper, loop and goods, are factors contributing to the uniform length of tufts formed.

Even if the shearing operation does not take place until after the travel of the goods has ceased, the continued backward movement of the looper is not such as should stretch or pull out any already formed loop or tuft. The shearing blade as well as the substantially horizontal lower edge of the looper, contribute to preventing this pulling out of a previous tuft. The movement of the loop with the looper and the location of the loop well back of the point of the looper also contribute to the absence of any necessity for a substantial hook on the tip of the looper as has been customary in this art. Of course the horizontal movement of the looper in a direction parallel to the work support is another feature that eliminates any necessity for a hook.

The needle guide surfaces 31 are only inclined enough to effect their guiding function. The inclination of the needle guide surface need not extend all the way to the base of the tooth-like support 35. The shearing blades may have their pressure against the looper controlled either individually by adjustment of the abutments 37 with respect to the rod 36 or collectively by control of the wing nut 42.

One or more uncut loops may or may not be carried by the looper. The lower edge 22 of the looper cooperates with the blade 23 to effect a shearing operation.

I claim:

1. In a multi-needle tufting machine of the type having a plurality of needles, a looper movable toward and from each of the needles, a support for the loopers, a shearing blade for each looper pivoted to the looper support, means for actuating said loopers and blades, means for pressing each blade against its looper, the improvement which comprises a movable member for adjusting the position of each of said pressing means and a manually controlled device for moving said member whereby the cutting adaptability of all of said blades may be simultaneously controlled.

2. A tufting machine comprising a needle, a looper, a looper support, a shearing blade cooperating with the looper, a support for said blade pivoted to the looper support, stationary means cooperating with said blade support, a guide for said needle located below the looper and means for simultaneously moving said looper support and needle guide in the general direction of the travel of the work.

3. In a multi-needle tufting machine of the type comprising a looper for each needle, a support for moving each looper, a shearing blade pivotally attached to each looper support, means for moving the loopers in timed relation to the travel of the needles, means for moving the shearing blades to sever loops carried by the loopers, the improvement which includes an inclined guide surface for each needle, a support for each surface located opposite the looper of the needle cooperating with each surface, said shearing blades terminating short of said guides.

4. A tufting machine having a needle, a looper substantially parallel to the work travel, means for moving the looper substantially parallel to said work, a support of L-shaped cross section for said looper, a shearing blade cooperating with said looper, an oppositely arranged L-shaped support for said blade, said looper and blade supports forming a closed rectangle and being pivotally connected diagonally opposite said looper and blade, means for sliding said looper support and blade, a projection on said blade support extending away from the blade and in substantial prolongation of the side of the L-shaped support carrying said blade, a stationary member engaging said projection and limiting sliding movement of said projection with said looper in each direction whereby said blade is moved toward and from said looper.

5. In a multi-needle tufting machine of the type having a looper cooperating with each needle, a shearing blade cooperating with each looper to cut a loop, the improvement which includes a bar extending longitudinally of the row of needles, said bar being provided with an abutment thereon for each blade, a spring between each abutment and its blade, said abutments each being adjustable with respect to said bar, and manually adjustable means for controlling the position of said bar.

6. A tufting machine having a plurality of needles, a looper for each needle, a shearing blade pivoted to each looper, means for actuating said loopers, means for actuating said blades in response to movement of said loopers, means for pressing each blade against its cooperative looper, and means for adjusting the pressure of a blade against its looper either individually or simultaneously with adjustment in pressure of the other blades against their loopers.

JOSEPH VERNON PARKER.